US007311993B2

(12) United States Patent
Ivanov et al.

(10) Patent No.: US 7,311,993 B2
(45) Date of Patent: *Dec. 25, 2007

(54) POLYFLUORINATED BORON CLUSTER ANIONS FOR LITHIUM ELECTROLYTES

(75) Inventors: Sergei Vladimirovich Ivanov, Schnecksville, PA (US); William Jack Casteel, Jr., Emmaus, PA (US); Guido Peter Pez, Allentown, PA (US); Michael Ulman, Alburtis, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 600 days.

This patent is subject to a terminal disclaimer.

(21) Appl. No.: 10/655,476

(22) Filed: Sep. 4, 2003

(65) Prior Publication Data

US 2005/0053841 A1    Mar. 10, 2005

(51) Int. Cl.
 H01M 2/26 (2006.01)
 H01M 6/16 (2006.01)
 H01M 6/04 (2006.01)
 H01M 10/26 (2006.01)

(52) U.S. Cl. ........................ 429/121; 429/342; 429/199; 429/207

(58) Field of Classification Search ................ 429/121, 429/199, 207, 342
See application file for complete search history.

(56) References Cited

U.S. PATENT DOCUMENTS

| | | | |
|---|---|---|---|
| 4,020,240 A | | 4/1977 | Schlaikjer |
| 4,071,664 A | * | 1/1978 | Dey ............................. 429/345 |
| 4,201,839 A | | 5/1980 | Johnson et al. .............. 429/194 |
| 4,331,743 A | | 5/1982 | Dey et al. |
| 5,154,989 A | * | 10/1992 | Howard et al. .............. 429/160 |
| 5,714,279 A | | 2/1998 | Zajac, Jr. et al. |
| 5,849,432 A | | 12/1998 | Angell et al. ................ 429/190 |
| 6,159,640 A | | 12/2000 | Appel et al. .................. 429/324 |
| 6,346,351 B1 | | 2/2002 | Yde-Andersen et al. .... 429/330 |
| 6,448,447 B1 | | 9/2002 | Strauss et al. |
| 6,514,474 B1 | | 2/2003 | Kikuyama et al. |
| 6,537,697 B2 | | 3/2003 | Kida et al. ................... 429/199 |
| 6,696,202 B2 | | 2/2004 | Arai |
| 6,781,005 B1 | | 8/2004 | Casteel, Jr. et al. |
| 6,852,446 B2 | * | 2/2005 | Barbarich .................... 429/207 |
| 2002/0028388 A1 | | 3/2002 | Lee |
| 2002/0177044 A1 | * | 11/2002 | Yagi et al. ............. 429/231.95 |
| 2003/0129497 A1 | | 7/2003 | Yamamota et al. |
| 2004/0029010 A1 | | 2/2004 | Sada et al. |
| 2005/0053841 A1 | | 3/2005 | Ivanov et al. |
| 2005/0064288 A1 | * | 3/2005 | Ivanov et al. ................ 429/188 |

FOREIGN PATENT DOCUMENTS

TW         249869         2/2006

OTHER PUBLICATIONS

Ivanov et al., "Synthesis and Stability of Reactive Salts of Dodecafluoro-closo-dodecaborate," J. Am. Chem. Soc. Comm. 125, 4694-5 (2003).*

S. Mori, et al., "Chemical Properties of Various Organic Electrolytes for Lithium Rechargeable Batteries . . . 1. Characterization of Passivating Layer Formed on Graphite in Alkyl Carbonate Solutions", Journal of Power Sources, 68 pp. 59-64 (1997).

D. Aurbach, et al., "Recent Studies on the Correlation Between Surface Chemistry, Morphology, Three-Dimensional Structures and Performance of Li and Li-C Intercalation Anodes in Several Important Electrolyte Systems", Journal of Power Sources 68, pp. 91-98 (1997).

S. Flandrois, et al., "Carbon Materials for Lithium-ion Rechargeable Batteries", Carbon 37, pp. 165-180 (1999).

Sergei V. Ivanov, et al., Synthesis and Stability of Reactive Salts of Dodecafluoro-closo-dodecaborate(2-), J. American Chemical Society, 2003, vol. 125, No. 16 pp. 4694-4695.

Ivanov, Sergei, Miller, Susie; Anderson, Oren; Sointsev, Konstatine, and Strauss, Steven; Synthesis and Stability of Reactive Salts of Dodecafluoro-closo-dodecaborate (2-); Department of Chemistry, Colorado State University, Fort Collins, Colorado and Institute of General and Inorganic Chemistry, Russian Academy of Sciences, Moscow 117907, Russia; J. Am. Chem. Soc. 2003, 125 4694-4695.

European Search Report completion date Dec. 20, 2005.

U.S. Appl. No. 10/924,293, filed Aug. 23, 2004, Sergei V. Ivanov et al.

U.S. Appl. No. 11/197,478, filed Aug. 8, 2005, Sergei V. Ivanov et al.

U.S. Appl. No. 11/372,907, filed Mar. 10, 2006, Sergei V. Ivanov et al.

European Search Report No. 04020911.6-2119, dated Dec. 20, 2005.

D. Aurbach, et al., "Recent Studies on the Correlation Between Surface Chemistry, Morphology, Three-Dimensional Structures and Performance of Li and Li-C Intercalation Anodes in Serveral Important Electrolyte Systems", Journal of Power Sources 68, pp. 91-98 (1997).

Sergei V. Ivanov, et al., Synthesis and Stability of Reactive Salts of Dodecafluorocloso-dodecaborate(2-), J. American Chemical Society, 2003, vol. 125, No. 16 pp. 4694-4695.

(Continued)

Primary Examiner—Dah-Wei Yuan
(74) Attorney, Agent, or Firm—Michael K. Boyer; Anne B. Kiernan

(57) ABSTRACT

The present invention relates to an improvement in lithium secondary batteries comprised of a negative electrode, a positive electrode, a separator, and a lithium-based electrolyte carried in an aprotic solvent and to the electrolyte compositions. The improvement resides in the use of a lithium electrolyte of the formula:

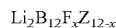

$Li_2B_{12}F_xZ_{12-x}$ wherein x=>5 and Z represents H, Cl, and Br. Preferably, when x is less than 12, Z is Cl.

30 Claims, 1 Drawing Sheet

OTHER PUBLICATIONS

Abboud, J.L.M, et al., "Critical Compliation of Scales of Solvent Paramenters, Part 1. Pure Non-Hydrogen Bond Donor Solvents"; Pure Appl. Chem., vol. 71, No. 4 pp. 645-718, 1999; pp. 645-718.

Abraham, K. M. et al; "Some Chemistry in the Li/SOCI. Cell;" Journal of the Elecrochemical Society; 1980, vol. 127, p. 2091-2096.

Bowden, W.; Electrochemical Oxidation of Polyhedral Boron Halide Anions; Journal of Electrochemical Society. vol. 129, 1982; p. 1249-1252.

Handbook of Batteries (3$^{rd}$ edition); edited by Linden; Reddy, McGraw-Hill; 2002.

Xu, Kang; "Nonaqueous Liquid Electrolyte for Lithium-Based Rechargeable Batteries;" Chemical Review; 104, 2004, pp. 4303-4417.

SAFT.com and batterspace.com web pages.

* cited by examiner

POLYFLUORINATED BORON CLUSTER ANIONS FOR LITHIUM ELECTROLYTES

BACKGROUND OF THE INVENTION

Lithium secondary batteries, by virtue of the large reduction potential and low molecular weight of elemental lithium, offer a dramatic improvement in power density over existing primary and secondary battery technologies. By secondary battery it is meant a battery that provides for multiple cycles of charging and discharging. The small size and high mobility of lithium cations allow for the possibility of rapid recharging. These advantages make lithium batteries ideal for portable electronic devices, e.g., cell phones and laptop computers. Recently, larger size lithium batteries have been developed and have application for use in the hybrid vehicle market.

The following patents are representative of lithium batteries and electrochemical cells:

U.S. Pat. No. 4,201,839 discloses an electrochemical cell based upon alkali metal-containing anodes, solid cathodes, and electrolytes where the electrolytes are closoborane compounds carried in aprotic solvents. Closoboranes employed are of the formula $Z_2BnXn$ and $ZCBmXm$ wherein Z is an alkali metal, C is carbon, R is a radical selected from the group consisting of organic hydrogen and halogen atoms, B is boron, X is one or more substituents from the group consisting of hydrogen and the halogens, m is an integer from 5 to 11, and n is an integer from 6-12. Specifically disclosed examples of closoborane electrolytes employed in the electrochemical cells include lithium octoborobromide, lithium decaborochloride, lithium dodecaborochloride, and lithium decaboroiodohydride.

U.S. Pat. No. 5,849,432 discloses electrolyte solvents for use in liquid or rubbery polymer electrolyte solutions based upon boron compounds with Lewis acid characteristics, e.g., boron linked to oxygen, halogen atoms, and sulfur. A specific example of an electrolyte solution comprises lithium perchlororate and boron ethylene carbonate.

U.S. Pat. No. 6,346,351 discloses secondary electrolyte systems for a rechargeable battery of high compatibility towards positive electrode structures based upon a salt and solvent mixture. Lithium tetrafluoroborate and lithium hexafluorophosphate are examples of salts. Examples of solvents include diethyl carbonate, dimethoxyethane, methylformate, and so forth. In the background, there is disclosed known electrolytes for lithium batteries, which include lithium perchlorate, lithium hexafluoroarsenate, lithium trifluoromethylsulfonate, lithium tetrafluoroborate, lithium bromide, and lithium hexafluoroantimonate electrolytes incorporated in solvents.

U.S. Pat. No. 6,159,640 discloses electrolyte systems for lithium batteries used in electronic equipment such as mobile phones, laptop computers, camcorders, etc based upon fluorinated carbamates. A variety of fluorinated carbamate salts, e.g., trifluoroethyl-N,N-dimethylcarbamate is suggested.

U.S. Pat. No. 6,537,697 discloses lithium secondary battery using a nonaqueous electrolyte including lithium tetrakis(pentafluorophenyl)borate as an electrolyte salt.

As represented above a wide variety of lithium-based electrolytes comprising a lithium salt for lithium batteries are disclosed and, although having use in many electronic applications, they are faced with problems associated with safety, oxidative stability, thermal stability, and so forth. Fluorinated electrolyte salts have had the additional problem that toxic HF can be produced on compound breakdown.

The following are some of the deficiencies associated with specific electrolyte salts: lithium hexafluorophosphate fails primarily on the basis that it is unstable, generating HF, which leads to electrode corrosion, particularly with $LiMn_2O_4$ cathode materials; lithium perchlorate has relatively low thermal stability leading to explosive mixtures above 100° C.; lithium hexafluoroarsenate has a problem of arsenic toxicity; and lithium triflate lead to significant corrosion of aluminum current collectors typically used in lithium ion batteries.

BRIEF SUMMARY OF THE INVENTION

The present invention relates to an improvement in lithium secondary batteries comprised of a negative electrode, a positive electrode, a separator, and a lithium based electrolyte salt carried in an aprotic solvent, to the resulting electrolyte salt and electrolyte compositions. The improvement resides in the use of a lithium salt of the formula:

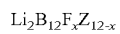

$$Li_2B_{12}F_xZ_{12-x}$$

wherein x=>5, preferably at least 8, and most preferably at least 10 but not more than 12 and Z represents H, Cl, and Br. Preferably, when x is less than 12, Z is Cl.

Some of the advantages associated with the use of the fluorinated lithium borohydride salt for forming the lithium-based electrolyte include:

an ability to use a lithium based salt for an electrolyte solution which has extraordinary chemical, thermal, and hydrolytic stability;

an ability to use a lithium electrolyte solution which can be used at a low lithium based salt concentration, e.g., one-half the concentration of many other lithium based salts, e.g., $LiPF_6$;

an ability to use a lithium based salt which is completely unreactive towards aqueous solutions or adventitious moisture; and, an ability to form low viscosity, low impedance lithium electrolyte solutions which can be recycled.

DETAILED DESCRIPTION OF THE INVENTION

Figure 1:
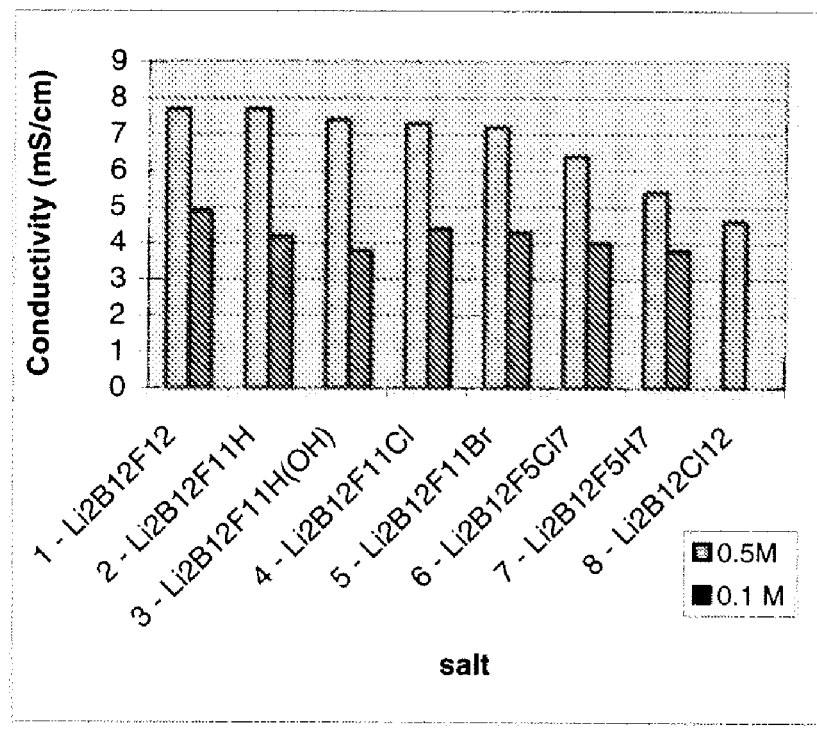
FIG. 1 is a graphical representation of conductivity of certain inventive electrolytes.

A lithium secondary battery, capable of multiple cycles of charging and discharging, is dependent on an electrolyte conducting solution carrying lithium ions. The two major requirements for lithium battery electrolyte solutions are: (a) a high conductivity in a non-aqueous ionizing solution, and (b) chemical stability to both heat, hydrolysis and particularly to electrochemical cycling over a wide potential range. Other desired features of lithium electrolyte solutions include: high flash point; low vapor pressure; high boiling point; low viscosity; good miscibility with solvents customarily employed in batteries, especially ethylene carbonate, propylene carbonate and alpha-omega-dialkyl glycol ethers; good electrical conductivity of their solutions over a wide temperature range, and tolerance to initial moisture content.

The present lithium secondary battery is characterized in that the lithium based electrolyte salt for forming lithium electrolyte solutions is based upon a lithium dodecafluorborate of the formula:

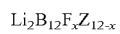

$$Li_2B_{12}F_xZ_{12-x}$$

where x=>5 (average basis), preferably at least 8, and most preferably at least 10 but not more than 12 and Z represents H, Cl, and Br. Specific examples of lithium based dodecafluorohalogenated borates include: $Li_2B_{12}F_xCl_{12-x}$ and $Li_2B_{12}F_xBr_{12-x}$ where x is 10 or 11.

The lithium salt employed for forming electrolytes solutions for use in lithium batteries can be formed by fluorinating hydridodecaborates initially to provide a dodecaborofluoride having at least 5, preferably at least 8 and most preferably at least 10 but not more than 12 or more hydrogen atoms replaced with fluorine (average basis). Simple metathesis using lithium hydroxide gives the lithium salt. This reaction is carried out in a liquid medium. In direct fluorination, fluorine is diluted with an inert gas, e.g., nitrogen. Fluorine concentrations from 10 to 40% by volume are commonly employed. If further halogenation is desired, the partially fluorinated hydridoborate is reacted with the desired halogen, e.g., chlorine or bromine.

Unlike the formation of lithium borobromides and chlorides, the formation of the highly fluorinated lithium dodecaborohydrides, e.g., those having at least 10 fluorine atoms is extremely difficult. Complete fluorination of the lithium hydridoborate can be effected, but because of the reactive nature of fluorine, there is associated attack of the hydridoborate, which leads to yield loss.

To facilitate formation of the lithium borofluorides as electrolyte salts, direct fluorination of the lithium hydridoborate is carried out in an acidic liquid medium, e.g., an acidic liquid medium or carrier such as neat or anhydrous HF reduced in acidity by the incorporation of an acid. Examples of acids include formic, acetic, trifluoroacetic, dilute sulfuric triflic, and sulfonic acids hydrohalic ($HCl_{(aq)}$, $HBr_{(aq)}$, $HI_{(aq)}$, and $HF_{(aq)}$). The addition of buffering salts, e.g., alkali metal fluorides such as potassium and sodium fluoride, also can reduce the acidity of neat HF in the fluorination reaction. A Hammett acidity, $H_o$, between $0 > H_o > -11$ is preferred as an acidic medium for effecting fluorination.

Radical scavengers can be used in the fluorination of lithium dodecaborohydride to reduce byproduct formation and improve reaction efficiency. In aqueous solutions, radical scavengers appear to limit the formation of hydrogen peroxide, or HOF which may be generated with fluorine. Radical scavengers are used to adjust acidity, and inhibit the side-reaction of fluorine with the solvent, thereby improving fluorination efficiency. Examples of radical scavengers include oxygen, and nitroaromatics. A simple method for introducing a radical scavenger is to introduce a small amount of air to the liquid medium.

Fluorination of the hydridoborate anion can be carried out over a temperature range sufficient to maintain liquid phase conditions. For effecting the fluorination of the dodecaborate anion the temperature generally ranges from −30 to 100° C., typically from 0 to 20° C. Pressures during fluorination are such as to maintain liquid phase conditions, typically atmospheric for the fluorination of the dodecaborate anion.

In the formulation of an electrolyte solution for a lithium battery, the lithium salt is carried in an aprotic solvent. Typically, these aprotic solvents are anhydrous but the fluorinated dodecaborate lithium salt employed here can tolerate some water. Anhydrous electrolyte solutions are preferred. Examples of aprotic solvents or carriers for forming the electrolyte systems include dimethyl carbonate, ethyl methyl carbonate, diethyl carbonate, methyl propyl carbonate, ethyl propyl carbonate, dipropyl carbonate, bis(trifluoroethyl) carbonate, bis(pentafluoropropyl) carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, perfluorobutyl ethyl carbonate, etc., fluorinated oligomers, dimethoxyethane, triglyme, dimethylvinylene carbonate, tetraethyleneglycol, dimethyl ether, polyethylene glycols, sulfones, and gamma.-butyrolactone.

In another embodiment, the electrolyte system of the present invention can comprise an aprotic gel polymer carrier/solvent. Suitable gel polymer carrier/solvents include polyethers, polyethylene oxides, polyimides, polyphosphazines, polyacrylonitriles, polysiloxanes, polyether grafted polysiloxanes, derivatives of the foregoing, copolymers of the foregoing, crosslinked and network structures of the foregoing, blends of the foregoing, and the like, to which is added an appropriate ionic electrolyte salt. Other gel-polymer carrier/solvents include those prepared from polymer matrices derived from polypropylene oxides, polysiloxanes, sulfonated polyimides, perfluorinated membranes (Nafion™ resins), divinyl polyethylene glycols, polyethylene glycol-bis-(methyl acrylates), polyethylene glycol-bis(methyl methacrylates), derivatives of the foregoing, copolymers of the foregoing, crosslinked and network structures of the foregoing.

The solution of aprotic solvent and fluorinated lithium dodecaborohydride employed for forming the lithium based electrolyte for the lithium battery typically will have a concentration of fluorinated lithium dodecaborohydride of at least 0.05 to 1 molar and preferably from 0.1 to 0.6 molar Most preferred ranges of lithium salt in the electrolyte are from 0.2 to 0.5 molar. Higher concentrations tend to become too viscous and, the bulk conductivity characteristics are adversely affected. Also, solutions formed from lithium based fluoroborates having an increased concentration of halogen atoms other than fluorine show an increase viscosity to the lithium fluoroborates having higher fluorine content.

Other lithium based salts can be used in combination with the lithium based fluoroborates, e.g. $LiPF_6$, lithium perchlorate, lithium hexafluoroarsenate, lithium trifluoromethylsulfonate, lithium tetrafluoroborate, lithium bromide, and lithium hexafluoroantimonate as desired. Typically, if such salts are used, they are added in small amounts to the lithium fluoroborate based electrolyte here or the lithium based fluoroborates are added to the batteries employing other based lithium salt in small amounts.

The lithium battery employing the fluorinated lithium dodecaborohydride electrolyte can be any using a lithium containing cathode and a negative anode. In forming the lithium battery, the negative electrodes for use in a lithium secondary battery typically can be based generally upon non-graphitizing carbon, natural or artificial graphite carbon, or tin oxide, silicon, or germanium compound. Any of the conventional anode compositions may be used in combination with the fluorinated lithium dodecaborohydride electrolytes here.

The positive electrode for use in lithium secondary batteries typically can be based upon a lithium composite oxide with a transition metal such as cobalt, nickel, manganese, etc., or a lithium composite oxide, part of whose lithium sites or transition metal sites is replaced with cobalt, nickel, manganese, aluminum, boron, magnesium, iron, copper, etc. or iron complex compounds such as ferrocyan blue, berlin green, etc. Specific examples of lithium composites for use as positive electrodes include $LiNi_{1-x}Co_xO_2$ and lithium manganese spinel, $LiMn_2O_4$. The former composite presents significant safety concerns due to the very high oxidizing potential of Ni(IV). The latter composite is significantly less oxidizing than the Ni(IV) lithium battery and leads to far better redox kinetics and much higher power densities than the nickel cobaltate cathode.

The separator for the lithium battery often is a microporous polymer film. Examples of polymers for forming films include: nylon, cellulose, nitrocellulose, polysulfone, polyacrylonitrile, polyvinylidene fluoride, polypropylene, polyethylene, polybutene, etc.

The battery is not limited to particular shapes, and can take any appropriate shape such as cylindrical shape, a coin shape, and a square shape. The battery is also not limited to particular capacities, and can have any appropriate capacity for both small appliances and power storage or electric cars.

The following examples are intended to illustrate various embodiments of the invention and are not intended to restrict the scope thereof.

EXAMPLE 1

Preparation of $Li_2B_{12}F_xH_{12-x}$, where x=10-12

A colorless slurry containing 2.96 g (11.8 mmol) $K_2B_{12}H_{12}CH_3OH$ in 6 ml formic acid at an average Hammett acidity of $H_o$=-2 to -4 was fluorinated at 0 to 20° C. When 100% of the desired $F_2$ (142 mmol) was added as a mixture of 10% $F_2$/10% $O_2$/80% $N_2$, a colorless solution remained. Further fluorination (3%) at 30° C. resulted in precipitation of solid from solution. Solvents were evacuated overnight, leaving 5.1 g of a colorless, friable solid. Analysis of this crude product by $^{19}F$ NMR revealed primarily $B_{12}F_{10}H_2^{2-}$ (60%), $B_{12}F_{11}H^{2-}$ (35%), and $B_{12}F_{12}^{2-}$ (5%). The crude reaction product was dissolved in water and the pH of the solution adjusted to between 4-6 with triethylamine and triethylamine hydrochloride. The precipitated product was filtered, dried, and resuspended in water. Two equivalents of lithium hydroxide monohydrate were added to the slurry and the resulting triethylamine evacuated. Additional lithium hydroxide was added until the pH of the final solution remained at 9-10 after distillation of all triethylamine. Water was removed by distillation and the final product was vacuum-dried at 200° C. for 4-8 hrs. Typical yields of $Li_2B_{12}F_xH_{12-x}$ (x=10,11,12) were ~75%.

EXAMPLE 2

Preparation of $Li_2B_{12}F_xBr_{12-}$) (x>10, ave. x=11)

3 g $Li_2B_{12}F_xH_{12-x}$ (x≧10) (0.008 mol) of average composition $Li_2B_{12}F_{11}H$ was dissolved in 160 mL of 1 M $HCl_{(aq)}$. $Br_2$, 1.4 mL (0.027 mol) was added and the mixture refluxed at 100° C. for 4 hours. A sample was taken for NMR analysis.

A portion of the above sample was returned to reflux and chlorine was added over a period of 6 hrs to form the more potent brominating agent BrCl. At the completion of chlorine addition, an aliquot was taken and NMR analysis showed the composition of the aliquot to be identical to the composition of the first aliquot. HCl and water were distilled away and the product was vacuum dried at 150° C. A total of 2.55 g white solid product was isolated. Theoretical for $Li_2B_{12}F_xBr_{12-x}$ (x≧10, ave. x=11) is 3.66 g.

EXAMPLE 3

Preparation of $Li_2B_{12}F_xCl_{12-x}$ (ave. x=11)

20 g "$Li_2B_{12}F_{11}H$" mixture dissolved in 160 mL 1 M HCl in a three neck round bottom flask fitted with a reflux condenser and fritted bubbler. The mixture was heated to 100° C. and $Cl_2$ gas was bubbled through at 15 sccm. The effluent, through the condenser, was passed through a solution of KOH and $Na_2SO_3$. After 16 hours of bubbling $Cl_2$, the solution was purged with air. The HCl and water were distilled out and the residue was triturated with ether. Upon ether evaporation and vacuum oven drying of the white solid, 20 g of material of the above formula were recovered (92%). $^{19}F$-NMR in $D_2O$: -260.5, 0.035 F; -262.0, 0.082 F; -263.0, 0.022 F; -264.5, 0.344 F; -265.5, 0.066 F; -267.0, 0.308 F; -268.0, 0.022 F; -269.5, 1.0 F. $^{11}B$-NMR in $D_2O$: -16.841; -17.878

EXAMPLE 4

Preparation of $Li_2B_{12}F_xCl_{12-x}$ (ave. x=3)

3.78 g $K_2B_{12}F_3H_9$ mixture was dissolved in 100 mL 1M HCl in a three neck round bottom flask fitted with a reflux condenser and fritted bubbler. The mixture was heated to 100 C and $Cl_2$ gas was bubbled through at 15 sccm. The effluent, through the condenser was passed through a solution of KOH and $Na_2SO_3$. After 8 hours of bubbling $Cl_2$, the solution was purged with air. There was some precipitate that formed and it was filtered out. The solution was brought to a pH of 9 by the addition of $Et_3N$ which produced a white precipitate. The solution was cooled to 0 C to maximize precipitation and then filtered on a Buchner funnel and washed with cold water. The solid was dried in a vacuum at 120 C. 4.62 g of a composition of the above formula was recovered. $^{19}F$-NMR in acetone-$d_6$: -225.2, 0.023 F; -228.5, 0.078 F; -229.5, 0.082 F; -231.2, 0.036 F; -232.8, 0.302 F; -233.2, 0.073 F; -234.3, 0.032 F; -235.5, 0.104 F; -237.6, 0.239 F; -238.4, 0.037 F; -239.8, 0.057 F; -242.0, 0.033 F. $^{11}B$-NMR in acetone-$d_6$: -6 multiplet; -15 multiplet.

EXAMPLE 5

Preparation of $Li_2B_{12}F_xCl_{12-x}$ (ave. x=11)

3 g $Li_2B_{12}F_{11}H$ mixture dissolved in 110 mL 1 M HCl in a three neck round bottom flask fitted with a reflux condenser and fritted bubbler. 1.4 mL $Br_2$ was added. The mixture was heated to 100° C. for 4 hours. An aliquot was removed for NMR analysis. The mixture was again heated to 100° C. and $Cl_2$ gas was bubbled through at 15 sccm. The effluent, through the condenser was passed through a solution of KOH and $Na_2SO_3$. After half an hour, the red $Br_2$ solution was yellowish. After another 6 hours of bubbling $Cl_2$, the solution was purged with air. An aliquot was taken for 19F NMR and found to be identical to the first sample. HCl and water were distilled out. The residue was vacuum dried at 150° C. 2.55 g of a composition of the above formula were recovered. $^{19}F$-NMR in $D_2O$: -257.8, 0.024 F; -259.0, 0.039 F; -259.5, 0.040 F; -261.0, 0.028 F; -261.5, 0.028 F; -263.0, 0.321 F; -265.2, 0.382 F; -269.2, 1.0 F.

EXAMPLE 6

Preparation of $Li_2B_{12}F_xCl_{12-x}$ (ave. x=3)

2.48 g $K_2B_{12}F_3H_9$ mixture was dissolved in 100 mL 1M HCl in a round bottom flask fitted with a reflux condenser. The mixture was heated to 100° C. After 8 hours of stirring, the solution was cooled to room temperature and left over the weekend. The excess $Br_2$ was neutralized with $Na_2SO_3$ and the solution was brought to a pH of 9 by the addition of $Et_3N$ which produced a white precipitate. The solution was cooled to 0° C. to maximize precipitation and then filtered on a Buchner funnel and washed with cold water. The solid was dried in a vacuum at 120° C. $^{19}F$-NMR in acetone-$d_6$: −212.2, 0.030F; −213.6, 0.284 F; −216, 0.100 F; −217.0, 0.100 F; −217.9, 0.100 F; −219.3, 1.0 F; −221.3, 0.201 F; −222.5, 0.311 F; −223.2, 0.100 F; −225.2, 0.100 F; −225.5, 0.639 F; −226.6, 0.149 F; −229, 0.245 F; −232.0, 0.120 F. Metathesis with $LiOH.H_2O$ was carried out as in Example 1. A composition described by the above formula was obtained.

EXAMPLE 7

Determination of Oxidative Stability, Decomposition Temperature, and Conductivity of Lithium Electrolyte Solutions for Use in Lithium Secondary Batteries Cyclic voltammetry (CV) experiments were performed using CH Instruments potentiostat and a conventional three-electrode cell under laboratory atmosphere. The working electrode was a platinum disc electrode (2 mm) and potentials were referenced to a $Ag/Ag^+$ reference electrode (silver wire immersed into 0.01 M $AgNO_3$ in 0.1 M acetonitrile [(n-Bu)$_4$N][BF$_4$] in a glass tube fitted with a Vycor tip). The reference electrode was calibrated to be 0.32 V versus the normal hydrogen electrode (NHE) using a ferrocene standard ($E_{1/2}(FeCp_2/FeCp_2+)=0.08$ V under described conditions). The electrolyte solutions were 0.01 M solutions of [(n-Bu)$_4$N][A] (A=anion of interest) in 0.1 M acetonitrile solution of [(n-Bu)$_4$N][BF$_4$].

The decomposition temperature was determined by DSC measurements on a TA Instruments DC2910 Differential Scanning Calorimeter.

The conductivities of the solutions of the mixed and pure $Li_2B_{12}X_{12}$ salts dissolved in a 50/50 wt. % ethylene carbonate (EC)/dimethyl carbonate (DMC) were determined using a Radiometer CDM210 conductivity meter and 2 pole CDC741T conductivity cell with build-in temperature sensor. The conductivity cell was calibrated using KCl solutions.

The conductivities, are shown in FIG. 1 and the oxidation potentials, and decomposition temperatures for the closoborate anions are shown in Table 1.

FIG. 1 shows that 0.5 M electrolyte solutions of salts of the anions having 5 or more fluorine atoms have excellent bulk conductivity. Better conductivities were obtained with the fluoro/halogen borohydride salts, e.g., samples 1, & 6 than a fluoroborohydride at the same fluorine level, e.g., samples 2, 3, & 7. Surprisingly, the salt, $Li_2B_{12}Cl_{12}$ (sample 8) had the poorest conductivity of all the salts tested. At the 0.1 molar concentration, the conductivities were significantly poorer showing that commercial, large scale batteries would require higher salt concentrations.

Viewing the results in greater detail, it is decidedly unexpected that at comparable concentrations, $Li_2B_{12}Cl_{12}$ (sample 8) has a conductivity of only ~0.6× that of the conductivity of $Li_2B_{12}\mu l_2$ (sample 1), even though $B_{12}Cl_{12}^{2-}$ is expected to be more weakly coordinating. Even more surprising is the fact that a 0.1 M solution of $Li_2B_{12}F_{12}$ (sample 1) is more conducting than $Li_2B_{12}Cl_{12}$ (sample 8) at 5× the concentration. This effectively means that on a weight basis it takes ~10 times as much $Li_2B_{12}Cl_{12}$ as $Li_2B_{12}F_{12}$ in an EC/DMC mixture to achieve the same ionic conductivity.

Not revealed from FIG. 1 is the relationship of the viscosity of the solutions to the bulk conductivity of the electrolyte. Under the test conditions, all of the fluorinated borohydrides exhibited a viscosity similar to water, i.e., the solutions were pourable. On the other hand, as the concentration of halogen atoms other than fluorine increased in the lithium fluoroborate, the viscosity of the resulting solutions formed from the lithium based fluoroborate increased substantially. The bulk conductivity of the resulting solution also decreased dramatically. For example, the salt, $Li_2B_{12}Cl_{12}$, at a 0.5 M level was too viscous and too low in bulk conductivity to be of commercial value.

In summary, the fully chlorinated lithium salt ($Li_2B_{12}Cl_{12}$) when evaluated as an electrolyte salt for a lithium battery has a conductivity at useful concentrations in typical aprotic electrolytes which is relatively low (4.6 mS/cm at 0.5M in 50/50 EC/DMC). On the other hand, and quite unexpectedly, $Li_2B_{12}F_{12}$ and the mixtures of salts $Li_2B_{12}F_x(H, Cl, Br)_{12-x}$ give rise to 0.5M solutions in EC/DMC of substantially greater conductivity than the fully chlorinated derivative (7.2-7.7 mS/cm). This result is surprising in view of the fact that the smaller $B_{12}F_x(H, Cl, Br)_{12-x}^{2-}$ anions were not expected to be as weakly coordinating as the $B_{12}Cl_{12}^{2-}$ anions.

TABLE 1

Oxidation, Decomposition Temp. (Stability) And Conductivity Of Lithium Electrolytes.

| Compound | Molecular wt. | Conductivity (mS/cm)$^a$ | Decomp. Temp. (° C.) | Oxidation Potential $E_{1/2}$ (V) vs. NHE; {~vs Li}; (reversible?) |
|---|---|---|---|---|
| $Li_2B_{12}Cl_{12}$ sample 8 | 569.5 | 4.6 (0.5 M) | >400 | >2.2 {>5.3}; ? |
| $Li_2B_{12}F_{12}$ sample 1 | 371.6 | 7.7 (0.5 M) 6.0 (0.25 M) 4.9 (0.1 M) | 465 | 1.87 {4.9}; (yes) |
| $Li_2B_{12}F_xH_{12-x}$ (x ≧ 10) Average x = 11 sample 2 | 353.6 | 7.7 (0.5 M) 4.2 (0.1 M) | 465 | 1.73 {4.7}; (yes) |
| $Li_2B_{12}F_xCl_{12-x}$ (x ≧ 10) Average x = 11 sample 4 | 388.1 | 7.3 (0.5 M) 4.4 (0.1 M) | — | 1.98 {5.1}; (yes) |
| $Li_2B_{12}F_xBr_{12-x}$ (x ≧ 10) Average x = 11 sample 5 | 432.5 | 7.2 (0.5) 4.3 (0.1) | — | — |
| $Li_2B_{12}F_xH_{12-x}$ (x ≧ 10) Average x = 11 Contains 5% $Li_2B_{12}F_x(OH)_{12-x}$ (x = 10, 11) | ~353.6 | 7.4 (0.5) 4.0 (0.1) | 465 | 1.28 {4.2}; (yes) |
| $B_{12}F_{10}(OH)_2^{2-}$ $Li_2B_{12}F_5H_7$ sample 7 | | | >400 | 1.6 {4.6}; (yes) |
| $Li_2B_{12}F_3H_9$ | | | >400 | 1.5 {4.5}; (no) |
| $B_{10}Cl_{10}^{2-}$ * | | | | 1.35; (yes) |

* $B_{10}Cl_{10}^{2-}$ is a literature value

Table 1 shows that the oxidative stabilities of the pure $Li_2B_{12}Cl_{12}$ and $Li_2B_{12}F_{12}$ salts and the mixtures $Li_2B_{12}F_xH_{12-x}$ (x>10) and $Li_2B_{12}F_xCl_{12-x}$ (x≧10) are sufficiently high to evaluate them as potential lithium battery electrolytes. From Table 1, it is interesting and unexpected that the oxidative stabilities of the $B_{12}Cl_{12}^{2-}$ anion and the $Li_2B_{12}F_xCl_{12-x}$ (x≧10) salt mixture were higher than that of the fully fluorinated anion $B_{12}F_{12}^{2-}$. Thus, the new mixed salt compositions, $Li_2B_{12}F_xCl_{12-x}$ (x≧10) are observed to provide a unique combination of a high conductivity with even better oxidative stability than $Li_2B_{12}F_{12}$, rendering them useful for both high power and high voltage battery applications. Although not intending to be bound by speculation, the decrease in oxidative stability of the fully fluorinated anion $B_{12}F_{12}^{2-}$ may be due to a π-back donation from fluorine atom to boron cluster. That analysis suggests that the $B_{12}Cl_{12}^{2-}$ anion may actually be a more weakly coordinating anion than $B_{12}F_{12}^{2-}$.

Table 1 shows that the decomposition temperature of the of the fully fluorinated anion $B_{12}F_{12}^{2-}$ and of the fully fluorinated/halogenated anion, $B_{12}F_xZ_{12}^{2-}$, are at least 400° C. and thus resistant to decomposition under normal battery conditions for operation. With respect to oxidative stability, lithium battery electrolytes are required to have high electrochemical oxidative stability. For high voltage lithium ion batteries, electrolyte oxidation at greater than 4.2 V vs. lithium metal (1.2 V vs NHE) is required. Because, the measured $E_{1/2}$ is usually 0.2 to 0.4 V higher than the actual onset of oxidation, electrolyte stability to at least a measured $E_{1/2}$ of 1.4 to 1.6 V vs. NHE is desired. As can be seen from the data in Table 1, this stability is readily met for those lithium dodecaborate salts containing at least 5 fluorine atoms.

From the data in Table 1, it is also clear that while fluorinated lithium dodecaborates with as few as 3 fluorine atoms, may possess suitable oxidative stability for certain lithium ion applications, the fact that its first oxidation is irreversible, suggests that $Li_2B_{12}F_3H_9$ would slowly, but steadily be depleted on successive charging and discharging of a 4.2 V lithium ion battery.

While decaborate salts, $B_{10}X_{10}^{2-}$ (x=F and/or Cl) may also be useful for some lithium ion applications, they are typically much more readily oxidized than their $B_{12}X_{12}^{2-}$ analogs.

EXAMPLE 8

Evaluation of Lithium-Based Electrolyte in Lithium Battery

In this example, a battery configuration was used employing a lithium foil–electrode||0.4-0.5M $Li_2B_{12}\mu l_2$ in EC/DMC|| $LiNi_{0.8}Co_{0.15}Al_{0.05}O_2$(+electrode). Using this configuration, it was demonstrated that a 0.5 molar (M) solution of $Li_2B_{12}\mu l_2$ in EC/DMC (3:7) allows equivalent or even slightly greater capacities than optimized electrolyte solutions employing 1.2 M $LiPF_6$ in the same cell configuration. More importantly in comparative tests it was seen that reducing the $Li_2B_{12}F_{12}$ concentration from 1 M to 0.5M reduces the ASI (area specific impedance) from 100 Ω/cm² to 40 Ω/cm² in this unoptimized solvent system. The target ASI value is ~35 Ω/cm² at room temperature.

The highest electrolyte solution conductivity for $Li_2B_{12}\mu l_2$ was observed at 0.4 M, and the conductivity at 0.3M was only slightly less than that at 0.5M. This suggested that it is possible to reduce concentration perhaps to a level of 0.3M or even 0.2 M and achieve the desired ASI without making any significant changes in solvent formulation. In fact it has been have found that at a concentration of 0.4M in EC/DMC (3:7) the ASI remains at ~40 Ω/cm².

The invention claimed is:

1. A lithium secondary battery comprising at least one salt and at least one solvent wherein the salt comprises:

a lithium dodecafluorborate salt of the formula:

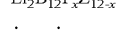

$$Li_2B_{12}F_xZ_{12-x}$$

wherein x is greater than or equal to 8 and less than or equal to 12 and Z represents H, Cl, and Br, and wherein the solvent comprises at least one member selected from the group consisting of chloroethylene carbonate, butylene carbonate, dimethyl carbonate, dimethylvinylene carbonate, ethylene carbonate, ethyl methyl carbonate, diethyl carbonate, methyl propyl carbonate, ethyl propyl carbonate, dipropyl carbonate, bis(trifluoroethyl) carbonate, bis(pentafluoropropyl) carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, propylene carbonate, heptafluoropropyl ethyl carbonate, perfluorobutyl ethyl carbonate, vinylene carbonate, fluorinated oligomers, dimethoxyethane, diglyme, triglyme, dimethylvinylene carbonate, trifluoropropylene carbonate tetraethyleneglycol, dimethyl ether, polyethylene glycols, sulfones, polyethers, polyethylene oxides, polyimides, polyphosphazines, polyacrylonitriles, polysiloxanes, sulfonated polyimides, perfluorinated membranes, divinyl polyethylene glycols, polyethylene glycol-bis-(methyl acrylates), polyethylene glycol-bis(methyl methacrylates), polyether grafted polysiloxanes, aprotic gel polymers, and gamma-butyrolactone.

2. The lithium secondary battery of claim 1 wherein Z is Cl, or Br.

3. The lithium secondary battery of claim 1 wherein the concentration of lithium dodecaborofluorate salt in the lithium electrolyte salt is from 0.05 to 1 molar.

4. The lithium secondary battery of claim 3 wherein Z is Cl or Br.

5. The lithium secondary battery of claim 1 wherein the solvent is selected from the group consisting of ethylene carbonate, dimethyl carbonate, ethyl methyl carbonate, diethyl carbonate, methyl propyl carbonate, methyl trifluoroethyl carbonate, dimethoxyethane, diglyme, and triglyme, propylene carbonate, trifluoropropylene carbonate, chloroethylene carbonate, vinylene carbonate, butylene carbonate, dimethylvinylene carbonate, and aprotic gel polymers.

6. The lithium secondary battery of claim 5 wherein x is 10 and at least one Z is Cl.

7. The lithium secondary battery of claim 5 wherein x is 11 and Z is Cl.

8. The lithium secondary battery of claim 5 wherein x is 12.

9. The lithium secondary battery of claim 1 further comprising:

a negative electrode, and a positive electrode, wherein the positive electrode comprises at least one oxide.

10. The lithium secondary battery of claim 9 wherein the negative electrode comprises at least one member selected from the group consisting of carbon, tin oxide, and silicon, or germanium compounds.

11. The lithium secondary battery of claim 9 wherein the positive electrode comprises at least one lithium oxide containing compound.

12. The lithium secondary battery of claim 10 wherein the negative electrode comprises carbon.

13. The lithium secondary battery of claim 11 wherein the positive electrode comprises at least one of $LiNi_{1-x}Co_xO_2$ and $LiMn_2O_4$.

14. The lithium secondary battery of claim 1 further comprising a separator.

15. The lithium secondary battery of claim 14 wherein the separator comprises at least one member selected from the group consisting of nylon, cellulose, nitrocellulose, polysulfone, polyacrylonitrile, polyvinylidene fluoride, polypropylene, polyethylene and polybutene.

16. The lithium secondary battery of claim 1 further comprising at least one member selected from the group consisting of $LiPF_6$, lithium perchlorate, lithium hexafluoroarsenate, lithium trifluoromethylsulfonate, lithium tetrafluoroborate, lithium bromide, and lithium hexafluoroantimonate.

17. The lithium secondary battery of claim 16 wherein said member comprises $LiPF_6$.

18. The lithium secondary battery of claim 5 wherein said solvent comprises vinylene carbonate.

19. The lithium secondary battery of claim 1 wherein the conductivity of the salt is greater than 4.0 mS/cm.

20. The lithium secondary battery of claim 1 wherein the molecular weight of the salt is less than 569.

21. The lithium secondary battery of claim 1 wherein the decomposition temperature of the salt is greater than 400C.

22. The lithium secondary battery of claim 1 wherein Z is H.

23. The lithium secondary battery of claim 9 wherein x is 12, the solvent comprises at least one of ethylene carbonate and ethyl methyl carbonate, the negative electrode comprises carbon, and the positive electrode comprises $LiMn_2O_4$.

24. A rechargeable lithium battery electrolyte comprised of at least one salt and at least one carrier wherein the salt comprises:

a lithium salt represented by the formula:

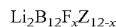
$Li_2B_{12}F_xZ_{12-x}$ wherein x is at least 8 but not more than 12 and Z represents H, Cl, and Br, wherein the carrier comprises at least one member selected from the group consisting of chloroethylene carbonate, butylene carbonate, dimethyl carbonate, dimethylvinylene carbonate, ethylene carbonate, ethyl methyl carbonate, diethyl carbonate, methyl propyl carbonate, ethyl propyl carbonate, dipropyl carbonate, bis(trifluoroethyl) carbonate, bis(pentafluoropropyl) carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, propylene carbonate, heptafluoropropyl ethyl carbonate, perfluorobutyl ethyl carbonate, vinylene carbonate, fluorinated oligomers, dimethoxyethane, diglyme, triglyme, dimethylvinylene carbonate, trifluoropropylene carbonate tetraethyleneglycol, dimethyl ether, polyethylene glycols, sulf ones, polyethers, polyethylene oxides, polyimides, polyphosphazines, polyacrylonitriles, polysiloxanes, sulfonated polyimides, perfluorinated membranes, divinyl polyethylene glycols, polyethylene glycol-bis-(methyl acrylates), polyethylene glycol-bis(methyl methacrylates), polyether grafted polysiloxanes and gamma-butyrolactone; and wherein the oxidation potential of the electrolyte is greater than 4.2 V v. Li metal.

25. The rechargeable lithium battery electrolyte of claim 24 wherein x is at least 10.

26. The rechargeable lithium battery electrolyte of claim 25 wherein the carrier comprises at least one member selected from the group consisting of ethylene carbonate, dimethyl carbonate, ethyl methyl carbonate, diethyl carbonate, methyl propyl carbonate, methyl trifluoroethyl carbonate, dimethoxyethane, diglyme, and triglyme, propylene carbonate, trifluoropropylene carbonate, chloroethylene carbonate, vinylene carbonate, butylene carbonate, dimethylvinylene carbonate, and an aprotic gel polymer, or polymer matrix.

27. The rechargeable lithium battery electrolyte of claim 26 wherein the carrier is selected from the group consisting of ethylene carbonate and propylene carbonate.

28. The rechargeable lithium battery electrolyte of claim 26 wherein x is 10 and Z is Cl.

29. The rechargeable lithium battery electrolyte of claim 26 wherein z is 11 and Z is Cl.

30. The rechargeable lithium battery electrolyte of claim 24 wherein Z is H.

* * * * *

UNITED STATES PATENT AND TRADEMARK OFFICE
CERTIFICATE OF CORRECTION

| | |
|---|---|
| PATENT NO. | : 7,311,993 B2 |
| APPLICATION NO. | : 10/655476 |
| DATED | : December 25, 2007 |
| INVENTOR(S) | : Sergei V. Ivanov et al. |

It is certified that error appears in the above-identified patent and that said Letters Patent is hereby corrected as shown below:

Column 11, Line 43

In claim 24 delete the word "dimethyi" and insert the word -- dimethyl --

Column 12, Line 13

In claim 24 delete the word "sulf ones" and insert the word -- sulfones --

Signed and Sealed this

Twenty-ninth Day of April, 2008

JON W. DUDAS
*Director of the United States Patent and Trademark Office*